United States Patent
Masuda et al.

[15] 3,696,730
[45] Oct. 10, 1972

[54] AIR COOLING SYSTEM OF AUTOMOTIVE ENGINE

[72] Inventors: Tetuzo Masuda, Tokyo; Kenjiro Kurosawa, Fukuoka-machi; Takeo Hashimoto; Takahisa Izumi, both of Tokyo, all of Japan

[73] Assignee: Nissan Motor Company, Limited, Yokohama, Japan

[22] Filed: Nov. 18, 1969

[21] Appl. No.: 877,808

[52] U.S. Cl..............................98/2.06, 237/12.3 H
[51] Int. Cl. .............................................B60h 1/24
[58] Field of Search....237/2 A, 8 A, 12.3 A, 12.3 W; 98/2, 2.05, 2.06, 2.07, 2.08

[56] References Cited

UNITED STATES PATENTS

| | | | |
|---|---|---|---|
| 2,067,758 | 1/1937 | Flogaus | 180/54 A |
| 2,316,421 | 4/1943 | Hans | 237/12.3 W |
| 2,766,836 | 10/1956 | Fessia | 180/54 A |
| 2,101,627 | 12/1937 | Nallinger | 123/174 |
| 2,814,448 | 11/1957 | Schutt | 237/8 A |
| 3,170,632 | 2/1965 | Gallie | 237/2 A |
| 3,207,440 | 9/1965 | Binder | 237/12.3 A |
| 3,300,619 | 1/1967 | Nilssen | 237/12.3 W |

Primary Examiner—Edward J. Michael
Attorney—McCarthy, Depaoli, O'Brien & Price

[57] ABSTRACT

A cooling arrangement for an automotive internal combustion engine having a crankshaft oriented rectangular to the longitudinal direction of the motor vehicle, which system includes a radiator positioned in front of the engine compartment and vented from the open air, a duct communicating at one end with the radiator and opened at the other to the open air in a direction rectangular to the longitudinal direction of the vehicle, and a fan provided in the duct and driven by the crankshaft of the engine. The radiator may cover an either total or partial front area of the engine compartment and the duct may have a branch duct communicating with the occupants' room.

1 Claim, 8 Drawing Figures

AIR COOLING SYSTEM OF AUTOMOTIVE ENGINE

This invention relates to a cooling arrangement of an internal combustion liquid cooled engine with the crankshaft rectangular to the longitudinal direction of the vehicle and more particularly to a system in which the cooling air is directed from the front air intake through a radiator and a suction fan to be exhausted to the side of the vehicle by an air duct.

In a conventional automobile vehicle the heat generated by the internal combustion is exhausted by a liquid into which the heat is transferred and which liquid is pumped through a cooling coil or radiator usually mounted in the front of the vehicle. The heat is dissipated into the open air from the cooling coil by introduction of cool air by a suction fan or, at higher vehicle speeds, through inertia so that sufficient heat values are disposed of through the cooling coil often referred to as the radiator.

The heated air into which combustion heat has been dissipated passes over the engine block and the carburettor thus reducing the effectiveness of engine cooling. Twin radiator systems are not acceptable for economical reasons. Furthermore, in an automobile of today's modern design, the space under the hood is crowded with equipment including air conditioning compressor etc., so that the air flow is restricted.

It is an object of this invention to overcome the drawbacks mentioned above and to provide a novel arrangement of cooling the liquid into which the heat created by combustion of the automobile fuel is dissipated.

It is another object of this invention to provide an air duct directing the air, into which the heat has been transferred, away from the engine block and the carburettor.

It is still another object of this invention to provide a heat transfer system dissipating heat formed during internal combustion in an automotive engine to the side of the automotive engine so that the heated air does not affect the engine or the carburettor.

It is still another object of this invention to provide a fan with the driving shaft mounted perpendicularly to the automobile center line with the radiator mounted transferring the heat from the cooling liquid into the open air also mounted perpendicularly to the center line. The fan may be driven directly by the crankshaft of the engine by a V-belt or otherwise by a simple drive mechanism.

It is still another object of this invention to isolate the carburettor system from the hot air into which the heat from the combustion has been dissipated and then transferred into the open air through the cooling liquid and a cooling coil.

It is still another object of this invention to provide means for heating the interior of a vehicle in cold weather by directing into the vehicle a part of the heat created by the internal combustion of the engine and dissipated through a radiator cooled by outside air which is partly blown inside the vehicle.

It is still another object of the present invention to provide a cooling system which does not interfere with the fuel feeding assembly (or the carburettor) in hot weather.

These and other objects of the present invention will be more apparent from the following description to be perused with the drawings of the preferred embodiments of the invention.

To accomplish these objects, the invention proposes to have a radiator at the front of a vehicle. Behind the radiator is provided a duct leading to the side of the engine to direct the hot air thereto. A cooling fan is provided at the outlet of the duct with its shaft parallel to the crankshaft of the engine. Thus, the hot air can be discharged from the duct without exercising any influence on the engine operation. The front face of the vehicle is either totally or partly covered by the radiator. Where the radiator is mounted to partly cover the front face of the vehicle, air entering the radiator as the vehicle advances is led not only to the duct but to the engine block thereby to cool it down when the engine is operating at a high speed.

In the drawings.

In the drawings as identified above, like numerals are assigned to like parts.

Figure 1A:
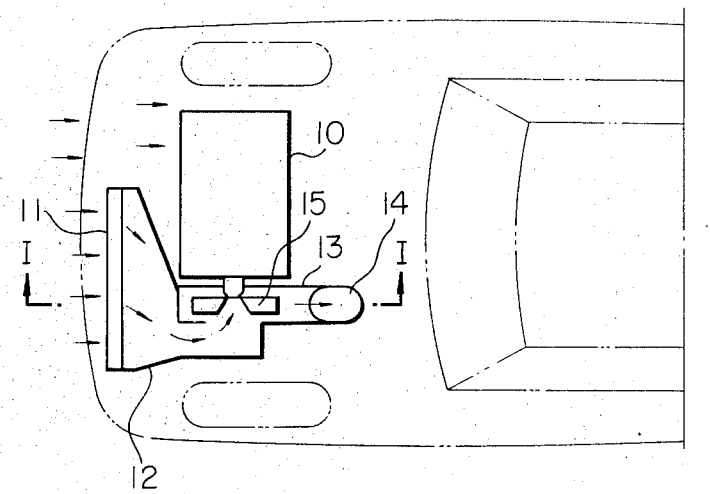
FIGS. 1a and 2a are plan views showing preferred embodiments of the cooling system according to this invention.

First referring to FIG. 1a, the cooling arrangement to which the invention is directed is applied to a vehicle having an engine 10 with its crankshaft (not shown) oriented at a right angle to the direction of advance of the vehicle.

Figure 1B:
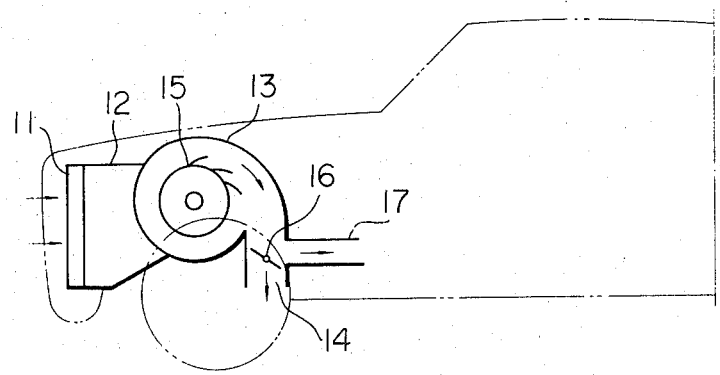
FIGS. 1b and 2b are section on lines I—I, II—II and III—III of FIGS. 1a and 2a, respectively.

A radiator 11 is provided at the front of the engine 10 to cover the total area of the front face of the vehicle thereby to pass hot air to the side of the engine 10 as the vehicle runs in the forward direction. Behind the radiator 11 is provided an air duct 12 led to the side of the engine 10 in such a manner that the air passing through the duct is entirely isolated from the engine. The air thus passed through the duct 12 is discharged through the casing 13 which is opened to the open air at the side of the vehicle body through an outlet 14. In this instance, the air is forced out of the outlet 14 by means of a fan 15 with its rotary shaft (not identified) parallel to the not shown crankshaft. If desired, as shown in FIG. 1b, a valve 16 and branch duct 17 may be provided before the outlet 14 thereby to direct the hot air to the occupant's room for heating purposes in cold weather.

Figure 2A:
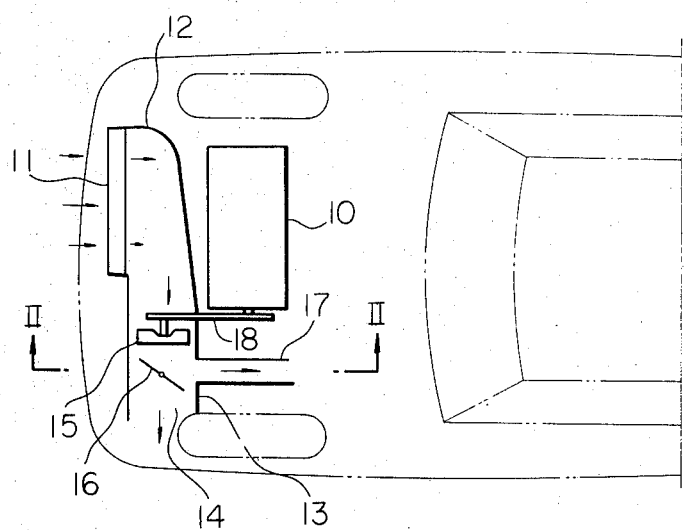
Figure 2B:
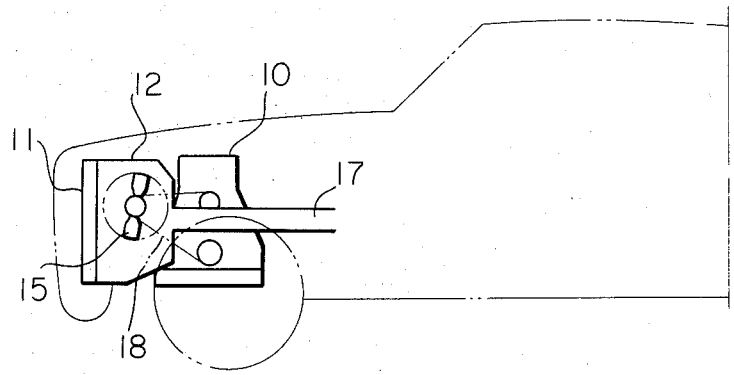

The fan 15 may be directly coupled with the engine crankshaft (not shown) or, otherwise, the same may be driven by the engine 10 through a driving belt 18 as seen in FIGS. 2a and 2b. The embodiment and its function herein shown are essentially similar to the first embodiment with an exception of the provision of this belt 18 and, hence, the detailed discussion thereof is omitted.

It may be understood that the cooling arrangement according to the invention features the provision of a duct leading from the front radiator and a fan forcing the air in the duct toward the outside of the vehicle and that such construction arrangement of the cooling arrangement as described is applicable to a vehicle having an engine with its crankshaft parallel to the longitudinal direction of the vehicle.

Although the duct 12 in the described embodiments is shown to totally cover the radiator 11, the same may be differently proportioned with respect to the coverage of the radiator.

Figure 3:
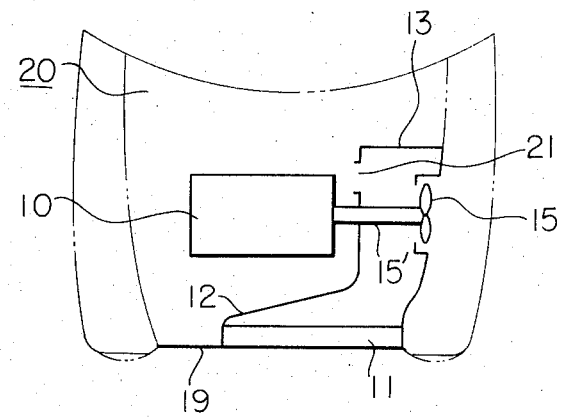
FIG. 3 is a plan view showing a modification of the cooling system shown in the preceding figures.

An example of such modified construction arrangement is illustrated in FIG. 3. As shown, a radiator 11a is provided at the front of the vehicle in such a manner as to cover only about two thirds of the front face of the vehicle, the rest of the area being used as an air vent 19. The air intake vent 19 communicates directly with the engine compartment 20 and the air admitted to the engine compartment 20 through the intake vent 19 is used to cool down the engine 10 especially when the vehicle is running at a high speed. Similarly to the previous embodiments of this invention, a duct 12 covering the total area of the radiator 11a is provided leading to the side of the engine 10, and a fan 15 is located past the casing 13 of the duct with its rotary shaft 15' oriented at a right angle to the fore-and-aft direction of the vehicle, in a direction parallel to the engine crankshaft (not shown).

If desired, a vent 21 may be provided in the wall of the casing 13, through which the engine compartment 20 communicates with the interior of the casing 13.

Thus, in this example of the cooling system according to the invention, not only the hot air from the radiator 11a is forced out en route the side of the engine but also fresh air is introduced into the engine compartment to cool it down when the vehicle is running at a high speed. The air thus used to cool down the engine is forced out through the vent 21 with the aid of the fan 15. The provision of the vent 21 will prove advantageous for preventing the engine from being unduly heated especially during the low speed or idling operation of the vehicle when the amount of air sucked in through the radiator 11 is not enough to cool the engine compartment.

Figure 4:
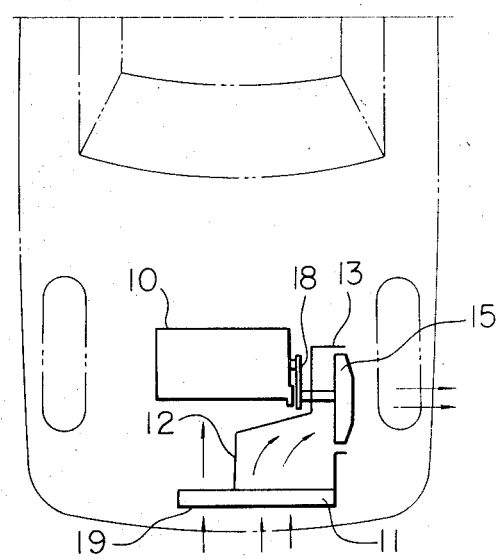
FIG. 4 is a plan view showing another preferred embodiment of the system according to the invention.

The fan 15 may be either directly coupled with the engine crankshaft (not shown) or driven by the engine 10 through a driving belt 18 as shown in FIG. 4.

Figure 5A:
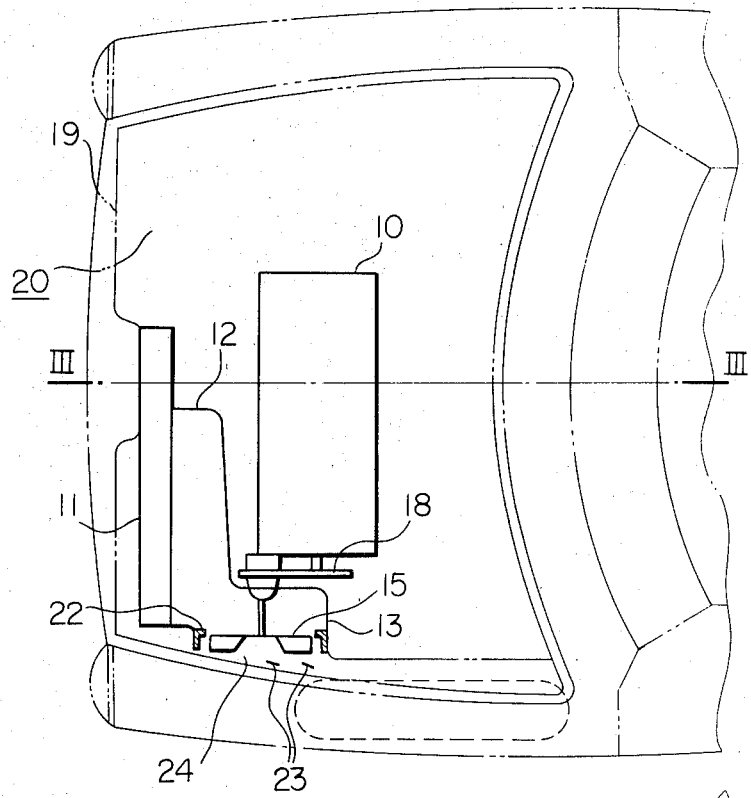
FIGS. 5a and 5b are a plan view and a section on line III—III thereof of a modification of the system shown in FIG. 4.

If preferred, a flanged ring 22 may be provided inside the casing 13 at a position immediately before the fan 15 with a view to preventing the hot air from re-circulating into the duct 12, as shown in FIG. 5a.

Figure 5B:
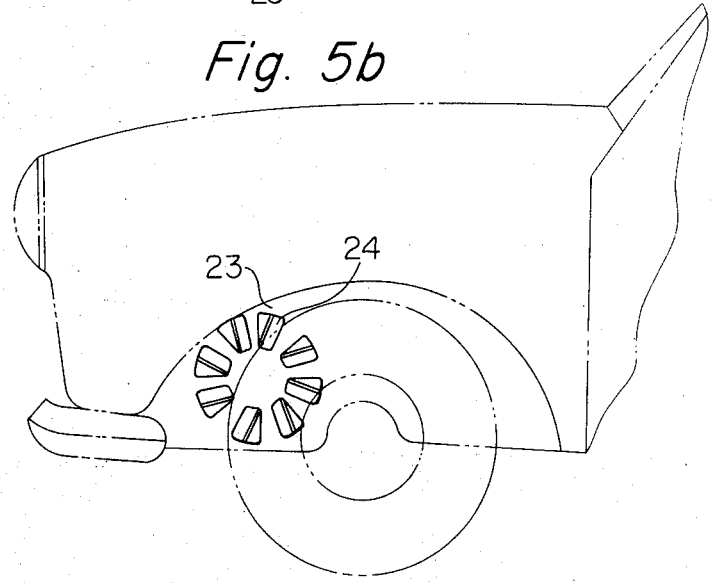

If further preferred, a series of guide vanes 23 may be provided at the outlet 24 of the casing 13, the vanes being formed integrally with a wall of the vehicle body, as generally designated at 24 in FIGS. 5a and 5b.

According to one important phase of this invention, as will be apparent from the foregoing description, the hot air passed through the radiator can be discharged without affecting the engine operation with use of a cooling system of compact structure.

According to another important phase of this invention, not only the hot air passed through the radiator is efficiently discharged to the outside, but additional fresh air is drawn directly into the engine compartment to cool down the engine. The air thus heated in the engine compartment can be forced out by means of a fan provided to discharge the hot air passed from the radiator.

Thus, the cooling system of the present invention should be noted for its simplified, economical construction and for its performance meeting the requirements of the engine throughout the different modes of operation of the vehicle.

We claim:

1. An engine cooling arrangement for a motor vehicle having a front engine compartment and an engine disposed in the engine compartment with its crankcase being transverse with respect to the longitudinal direction of the vehicle, comprising in combination: a radiator for the engine coolant disposed in the front plane of the engine compartment for directly receiving ambient fresh air, said radiator partially covering the front plane of the engine compartment for forming an aerodynamic air intake at the uncovered front plane to allow fresh air to directly flow into the engine compartment while the vehicle is running at high speed; a duct disposed in the engine compartment downstream of said radiator for receiving heated air converted from the fresh air passing through said radiator and having an outlet substantially sideways of the engine compartment, said duct having a vent formed in a position opposite and behind with respect to said outlet thereof, said vent opening into the engine compartment; and a fan having a rotary shaft arranged substantially in parallel with the crankcase of the engine and having a propeller disposed adjacent to said outlet of said duct so as to forcibly convey said heated air in said duct to the outside of the vehicle through said outlet and so as to forcibly remove stagnant hot air from the engine compartment through said vent and said outlet of said duct to the outside of the vehicle when the vehicle is running at low speed.

* * * * *